United States Patent [19]
Andrzejewski, Jr. et al.

[11] Patent Number: 5,551,314
[45] Date of Patent: Sep. 3, 1996

[54] LEAD SCREW AND LINEAR DRIVE ASSEMBLIES USING SUCH LEAD SCREW

[76] Inventors: Max C. Andrzejewski, Jr., 117 Arden Dr., Glenshaw, Pa. 15116; John D. Steranko, 23 Seneca Dr., Pittsburgh, Pa. 15228; Richard K. Steranko, 201 Outlook Dr., Pittsburgh, Pa. 15228

[21] Appl. No.: 294,954

[22] Filed: Aug. 24, 1994

[51] Int. Cl.⁶ ................................................. F16H 55/17
[52] U.S. Cl. ........................ 74/459; 74/424.8 R; 411/424
[58] Field of Search ................ 74/459, 458, 424.8 R, 74/89.15; 411/424, 411, 438; 470/8, 10, 905; 384/58, 449, 549

[56] References Cited

U.S. PATENT DOCUMENTS

| | | | |
|---|---|---|---|
| 534,164 | 2/1895 | Larsh | 411/411 |
| 2,831,363 | 4/1958 | Lohr | 384/549 |
| 3,071,022 | 1/1963 | Strandgren | 74/458 |
| 3,407,251 | 10/1968 | Elliott et al. | 411/411 |
| 4,576,057 | 3/1986 | Saari | 74/424.8 R X |
| 4,811,618 | 3/1989 | Takayama | 74/458 X |
| 4,964,314 | 10/1990 | Wilkes | 74/424.8 R X |
| 5,079,963 | 1/1992 | Yamamoto et al. | 74/89.15 |
| 5,325,732 | 7/1994 | Vogel | 74/424.8 R |

FOREIGN PATENT DOCUMENTS

| | | | |
|---|---|---|---|
| 812487 | 8/1951 | Germany | 411/411 |
| 2138011 | 1/1981 | Germany | 74/89.15 |
| 4647 | 1/1971 | Japan | 411/438 |
| 795780A | 1/1981 | U.S.S.R. | 470/10 |

Primary Examiner—Charles A. Marmor
Assistant Examiner—Troy Grabow
Attorney, Agent, or Firm—Bartony Hare & Edson

[57] ABSTRACT

A composite lead screw for use in a linear drive assembly is provided. The lead screw comprises a generally cylindrical carrier means. The carrier means has disposed therein at least one helical seating groove. This helical seating groove has a lead substantially equivalent to the lead of the lead screw. The lead screw also comprises at least one helical guide means having a lead substantially equivalent to the lead of the lead screw. The helical guide means is seated in the helical seating groove. A follower nut for use in a linear drive assembly in conjunction with the lead screw is also provided.

9 Claims, 5 Drawing Sheets

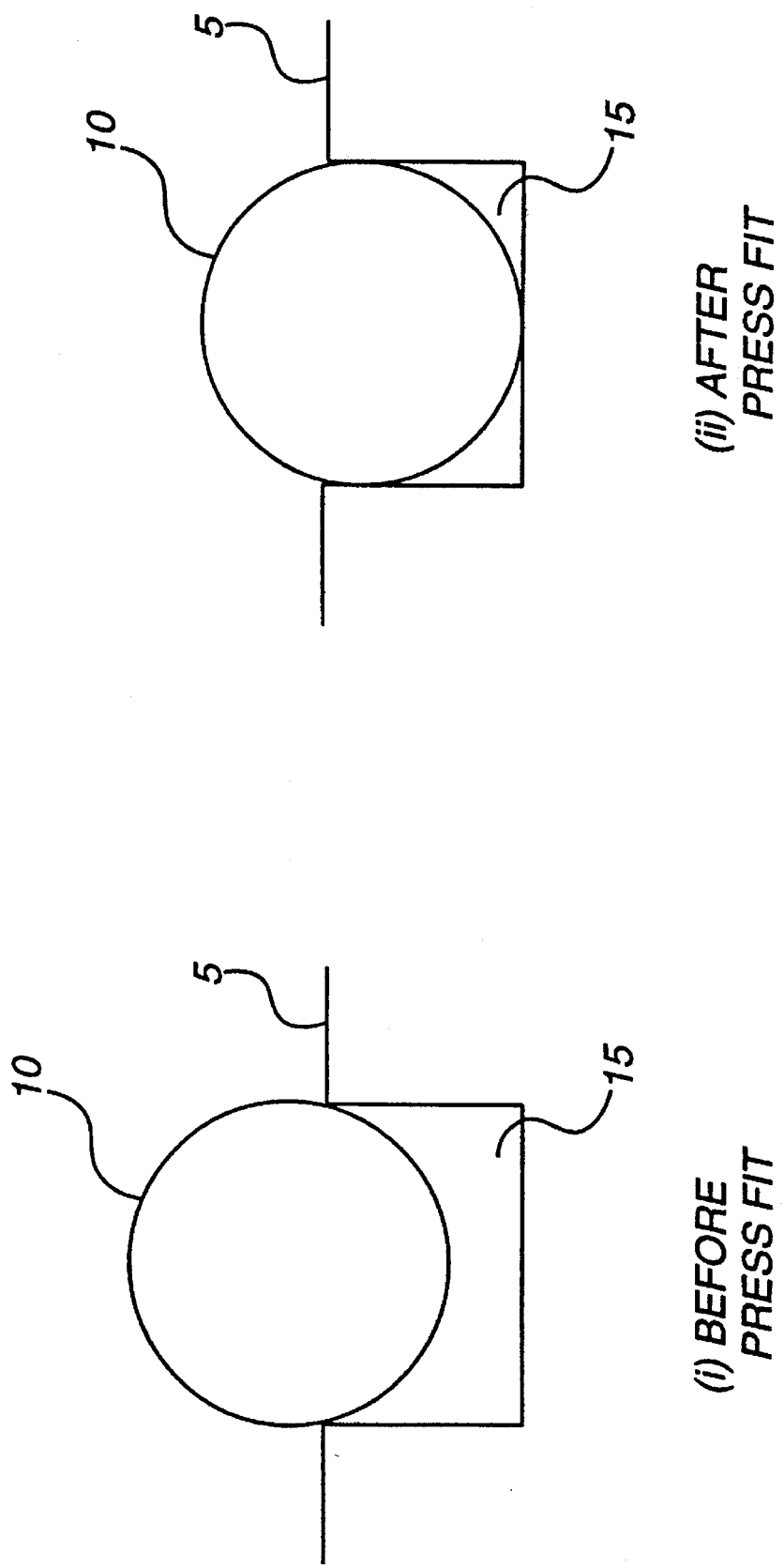

LEAD SCREW AND LINEAR DRIVE ASSEMBLIES USING SUCH LEAD SCREW

FIELD OF THE INVENTION

The present invention relates to a lead screw and linear drive assemblies using such lead screw, and especially to a composite lead screw comprising a helical guide rail and a helical guide rail seating means.

BACKGROUND OF THE INVENTION

Mechanized, linear motion can be achieved through a number of linear drive means including hydraulic cylinders, pneumatic cylinders, chain systems, rack and pinion systems, cable systems and lead screws assemblies. Lead screws assemblies are the best choice for effecting linear motion when the following are required: positional accuracy, design adaptability, simplicity of design, compactness of design, control compatibility, reliability, repeatability, ease of maintenance and high load capacity. An excellent discussion of the historical development of lead screws and the present designs thereof is provided in *Lead Screws: A Technical Brief,* (1989), available from Ball Screws & Actuators Co., Inc. of San Jose, Calif., the disclosure of which is incorporated herein by reference.

Modern lead screw assemblies generally comprise a lead screw and a nut assembly supported in bearings. All that is required to produce linear motion with a lead screw assembly is rotation of the lead screw or rotation of a follower nut. This simplicity enables the use of virtually any type of drive mechanism. Moreover, because the drive mechanism can be connected directly to the lead screw, precise control of motion is easily achieved. Lead screws are ideally suited for machine tools utilizing either manual or computer numerical control (CNC).

Linear guidance slideways (also known as guideways or raceways), ball bearings, and lead screw assemblies or actuators have a common developmental history in that the development of early milling machines and other industrial machines required a combination of these devices to perform a variety of machining operations, such as milling, drilling, and grinding. In these industrial machines, linear guidance slideways formed a guidepath to allow stock to be machined against tools and/or cutting devices. As many of these devices required high precision and heavy stock removal, a lead screw actuator comprising a lead screw and nut was placed between and/or adjacent the linear guidance slideways to provide both positional control and a mechanical advantage. Generally, the nut was attached to the guidance slideway and the ends of the lead screw were secured in bearing blocks to allow rotation of the lead screw. Motors or large wheels were attached to the end of the lead screw to provide rotational leverage or force.

Early slideways utilized sliding friction between two pads, lubricated with grease and placed on either side of the slideways. As industry became more mechanized, accuracy, speed, and force requirements led to the development of higher performance sealed bearings and ball bearing slideways. These devices limited the point of contact between slideways, thereby reducing friction and allowing machine tool builders to tighten tolerances between slideways. The basic design incorporated small ball bearings housed in a precision-machined raceway. Long raceways were constructed to allow the ball bearings to slide along shaftways. Because there was less friction between parts, machine tools could be constructed within narrower tolerances, while providing faster motion and greater accuracy.

THK Co., Ltd. of Tokyo, Japan developed a process for grinding several different raceways along the faces of a long rectangular steel bar. The resultant bearings and slideways are extremely accurate and durable, but are also extremely expensive because of the capital equipment and technology necessary to manufacture them.

A less expensive bearing designed by the Bishop-Wisecarver Corp. of Pittsburg, Calif. incorporates a round, sealed ball bearing with an extra thick outer raceway ground into a V-shape. This track roller rolls along a roll-formed, steel V-shaped track. Limitations of the mounting and supporting structure of the track roller and the relatively low precision of the roll-formed track prevent this design from obtaining a broad range of applications. It is mainly used in material handling applications rather than in machine tools.

INA Linear Technik, Inc. (INA) of Germany developed a modified version of the Bishop-Wisecarver V-roller bearing. By grinding an arched raceway, INA produced a double-row, angular contact, ball bearing. This design allows a track roller to ride on precision ground shafting as opposed to a relatively low-precision, rolled, V-track. In addition, the double-row bearing geometry is more stable and more securely mounted. These improvements have allowed use of the INA bearing in numerous machine tool applications. To reduce fabrication costs of the INA track roller linear guidance systems, the guideway is a composite structure comprising an aluminum body having a channel in which a linear, hardened and ground steel rod is disposed.

Similar to early linear guidance slideways, early lead screw actuators employed sliding friction between the lead screw and the following nut. Lubricant was placed directly on the lead screw and lubricated the follower nut as it slid along the lead screw. Lead screws of this type, known as Acme lead screws, are still in use today. Such Acme lead screws are available, for example, from Nook Industries, Inc. of Cleveland, Ohio. A certain amount of play or "backlash" (axial free motion between the nut and lead screw) is required to prevent jamming in such Acme lead screws. This backlash limits the application of such devices to medium tolerance machines and manual backdriving to correct for the backlash. The term "backdriving" describes the occurrence of an applied load forcing either the lead screw or the follower nut to rotate back through the driving mechanism. Moreover, the frictional forces generated by Acme lead screw assemblies make these assemblies quite inefficient.

Like linear guidance raceways, modern lead screw assemblies take advantage of the ball bearing. Lead ball screw assemblies began to appear in the United States in the 1940's. These assemblies comprise a lead ball screw, which is a shaft member having an inner helical ball track, and a ball nut, which is a follower nut containing an outer helical track housing ball bearings. Lead ball screw assemblies are available, for example, from Ball Screws & Actuators Co., Inc. and THK Co., Ltd.

The three basic methods of manufacturing lead screws and follower nuts are thread cutting, thread rolling and thread grinding. Thread cutting is generally limited to Acme screws. The lead of rolled lead screws is typically found to vary over the length of the lead screw. Ground lead screws assemblies provide better lead accuracy and repeatability, but are much more expensive to fabricate than rolled lead screw assemblies. To achieve accuracies better than 0.003 in./ft., the use of a precision ground lead screw assembly is generally required.

Even the cost of relatively less precise rolled lead screw assemblies is not insubstantial, however. In an attempt to alleviate such cost constraints, derivative linear driving mechanisms have been developed. For example, a Uhing® rolling ring drive is available from Amacoil, Inc. of Aston, Pa. This ball bearing device incorporates six standard ball bearings canted to a fixed or variable lead angle. Three canted ball bearings are positioned on one bearing block, and three canted ball bearings are positioned on another bearing block. The canted ball bearings are spring-loaded against a simple, low-cost ground round shaft. As the shaft is turned, the bearing block moves along the shaft according to the lead angle or pitch angle of the bearings, similar to the movement of a nut along a shaft. The motion is very smooth and the components are very inexpensive. However, because there is no raceway and the accuracy is dependent on friction developed by spring-loading, slippage of the bearing block renders the device useless for machine tool design.

It is very desirable to develop a linear drive assembly that can achieve the accuracy of rolled and ground lead screw assemblies without the expense associated with the fabrication of such lead screw assemblies.

SUMMARY OF THE INVENTION

Accordingly, the present invention provides a composite lead screw, a follower nut and linear drive assemblies incorporating the composite lead screw and follower nut that achieve the accuracy of rolled and even ground lead screw assemblies, without the substantial fabrication costs associated with rolled and ground lead screw assemblies.

In general, the present invention provides a composite lead screw for use in a linear drive assembly comprising a generally cylindrical carrier means. The carrier means has disposed therein at least one helical seating groove. This helical seating groove has a lead substantially equivalent to the lead angle of the lead screw. The lead screw also comprises at least one helical guide means, having a lead substantially equivalent to the lead of the lead screw. The helical guide means is seated in the helical seating groove.

Preferably, the carrier means is fabricated of anodized aluminum and the helical guide means is fabricated of a ground, hardened steel. In this manner, a composite lead screw having substantially the accuracy and repeatability of conventional ground lead screws can be fabricated at a fraction of the cost of conventional ground lead screws.

The present invention also provides a follower nut for use in a linear drive assembly in conjunction with the above described lead screw. The follower nut comprises a housing member, having a bore axially therethrough. This bore has a diameter slightly greater than the diameter of the lead screw. The follower nut further comprises at least three roller bearing means. Each of these roller bearing means comprises a raceway suitable to seat the helical guide means of the lead screw.

The roller bearing means are disposed around the circumference of the bore upon a helical path having a lead angle substantially the same as a lead angle of the helical guide means such that the roller bearings contact the helical guide means and provide a bearing surface therefor when the lead screw is threaded through the bore of the follower nut.

Multiple helical guide means may be used upon the same cylindrical carrier means (requiring multiple helical seating means for seating thereof). Multiple helical guide means allow the use of more roller bearing means than a single helical guideway and thereby increase the maximum thrust load supportable by the assembly. Alternatively, multiple helical guide means may be included upon a single carrier means to provide one or more spare guideways should a previously used guide means become worn.

Lead accuracy is generally defined as the measured amount that a reference (usually the face of the follower nut) is away from the theoretical center point at a specified distance when moved from a point A to a point B. The distance is typically defined as 12 inches in total travel (movement), and the lead error is said to be ± X inches from the 12 inch distance. The lead error is termed cumulative or non-cumulative, depending on whether any error in one measured distance is or is not added to the error in an adjacent distance. Precision ground lead screws can have accuracies of ±0.0002 in./ft., ±0.0005 in./ft and ±0.001 in./ft. Rolled thread lead screws can have accuracies of approximately 0.003 in./ft. and ±0.015 in./ft. In general, any lead screw with a lead accuracy specification of ±0.001 in./ft. or better is manufactured by thread grinding. Rolled thread screws with a lead accuracy of 0.003 in./ft. or better are generally selected from specially controlled production runs. *Lead Screws: A Technical Brief,* supra.

The present lead screw and linear drive assemblies are capable of providing lead accuracies better than approximately ±0.005 in./ft. The present lead screw and linear drive assemblies are also capable of providing lead accuracies better than approximately ±0.003 in./ft. Still further, the present lead screw and linear drive assemblies are capable of providing lead accuracies better than approximately ±0.001 in./ft. Moreover, unlike rolled lead screws, the lead of the present lead screw is substantially constant over the length of the lead screw.

Linear drive assemblies incorporating the present lead screw and follower nut thus provide control of linear motion with a degree of accuracy and repeatability previously attainable only through the use of very expensive precision ground lead screws. The cost advantage afforded by the present invention enables broadening of the use of precision linear drive assemblies to instruments and industries in which such use was not previously economically feasible. To provide one example, the present invention is very suitable for use in CNC machining centers developed for automated cutting, drilling, routing and sawing of wood and other material.

BRIEF DESCRIPTION OF THE DRAWINGS

FIG. 3A illustrates in cross section the press fitting of a helical guide means into the helical seating groove.

DETAILED DESCRIPTION OF THE INVENTION

Figure 1:
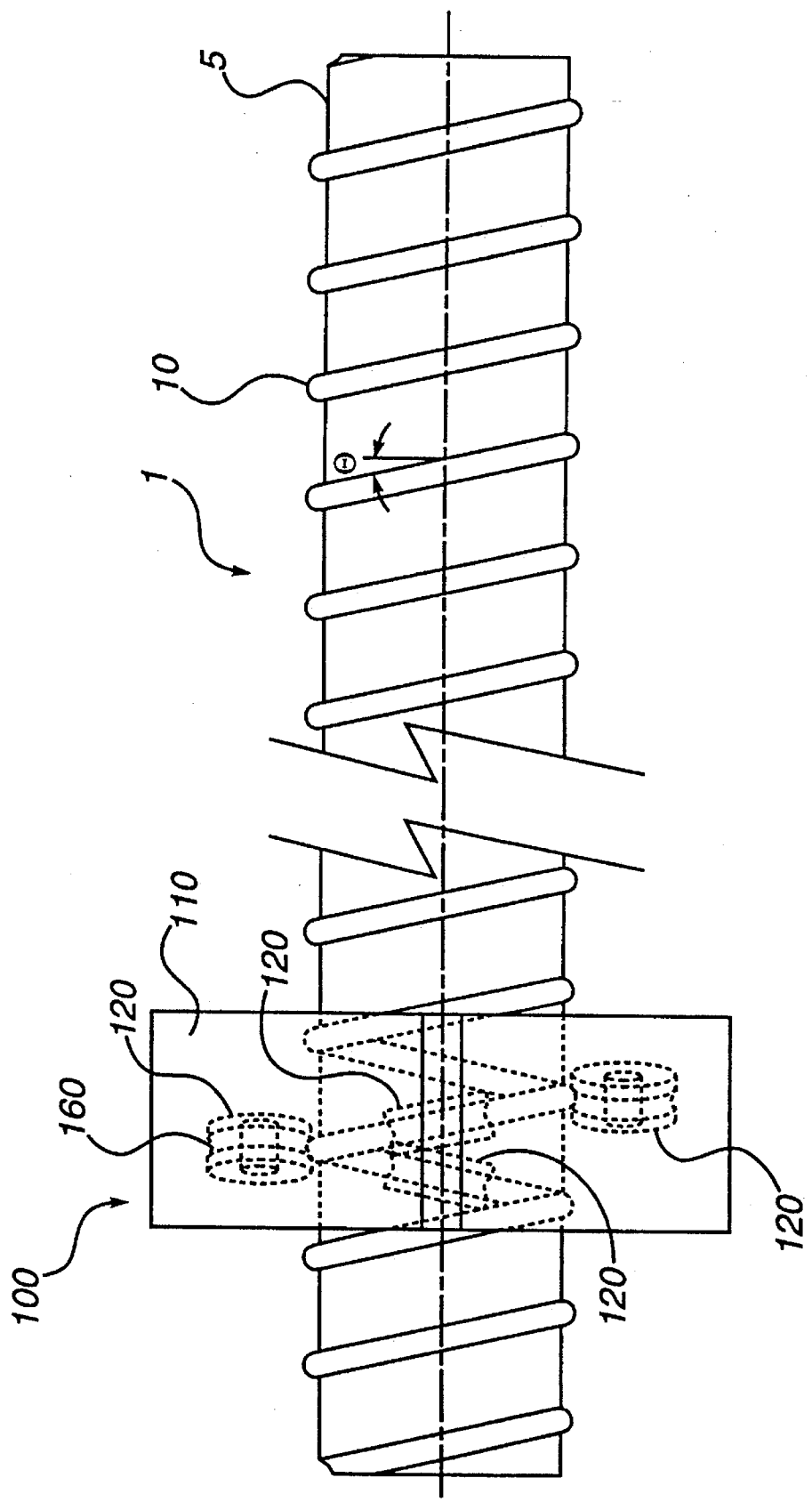
FIG. 1 illustrates one embodiment of a linear drive assembly under the present invention comprising a lead screw and a follower nut.
Figure 2:
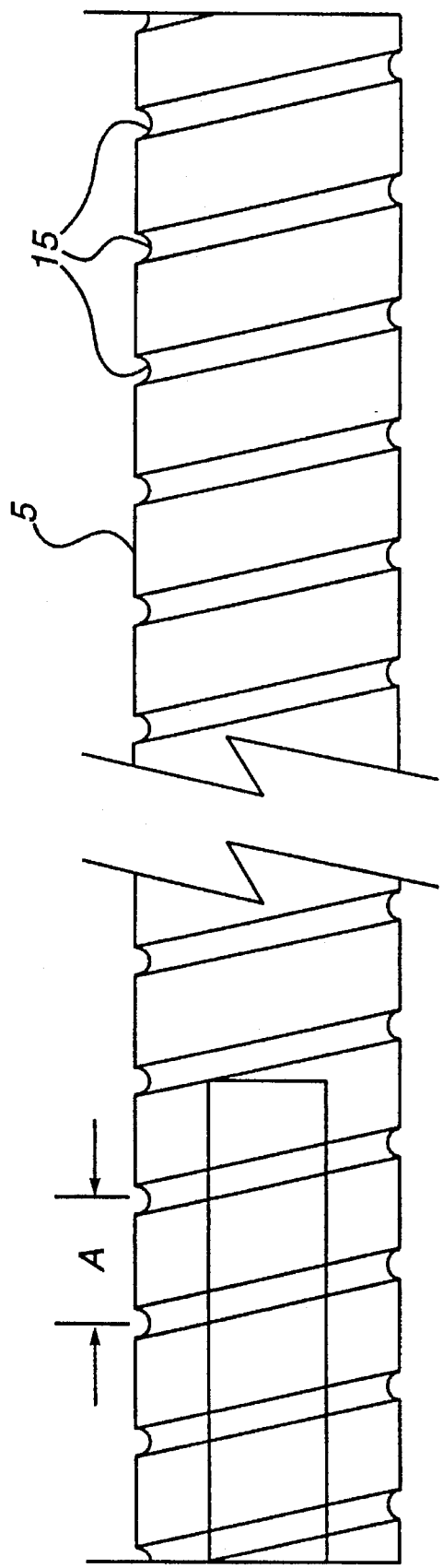
FIG. 2 illustrates an embodiment of a generally cylindrical carrier member of a lead screw.

Referring to FIG. 1, the present composite lead screw 1 comprises a generally cylindrical carrying member 5 and a helical guide means 10 disposed upon carrying member 5. As best illustrated in FIG. 2, carrying member 5 comprises at least one helical seating groove 15 disposed upon the surface thereof to receive helical guide means 10.

Figure 3:
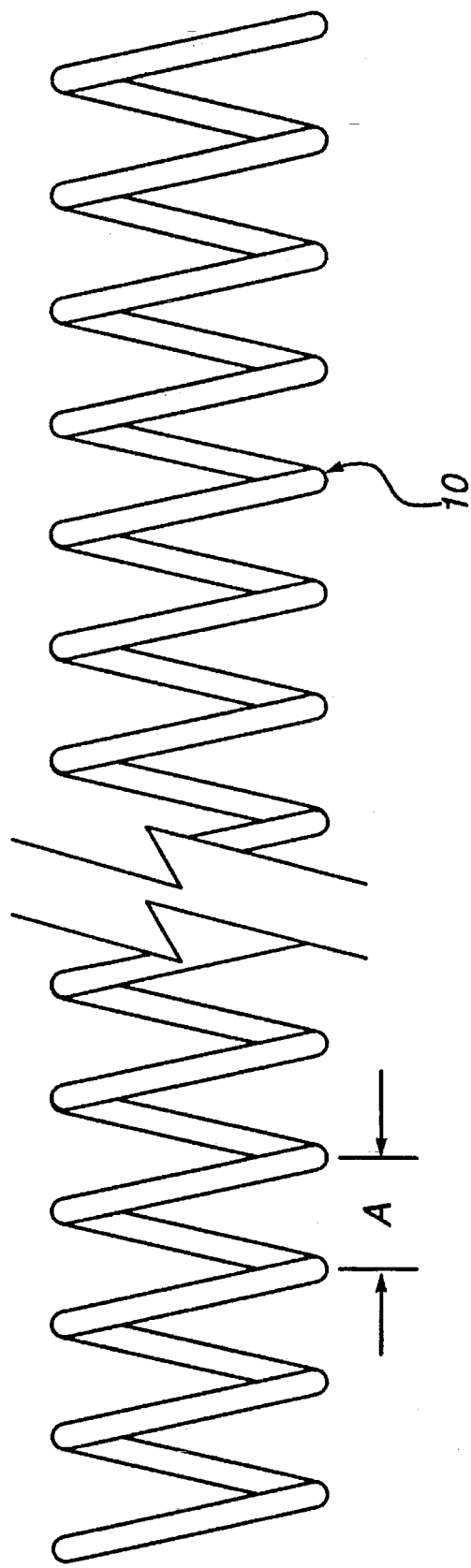
FIG. 3 illustrates a helical guide means of a lead screw.

As best seen in FIG. 3, helical guide means 10 comprises a helical length of a material suitable to act as a guide rail in a machine tool. Helical guide means 10 can be fabricated from any ferrous, nonferrous or composite material that can operate as a wear or bearing surface. Suitable materials for helical guide means 10 include: hardened, ground steel, oil tempered ASTM A229 steel, music wire (cold drawn steel) and certain polymers such as UHMW (ultra high molecular weight) polyethylene. For precision, preferably a medium to high carbon content hardened, ground steel is used for helical guide means 10.

In general, helical guide means 10 may be fabricated via well known methods for manufacturing springs, which generally involve roll forming lengths of metal through a spring winding apparatus. Details of the manufacture of helical metal springs can be found in *Handbook of Spring Design*, published by Spring Manufacturers Institute (1991), the disclosure of which is incorporated herein by reference.

The coil can be hot or cold wound. If cold wound, the coil is generally heat treated to release stress and provide a suitable tensile strength. High tensile strength results in a stiff coil, but creates a hard wear surface. If the coil is hot wound, the coil is generally quenched and subsequently tempered (via heat treatment) to prevent brittleness.

In general, carrying member 5 can be fabricated of any material sufficiently incompressible to withstand the radial and axial forces exerted upon helical guide means 10 during use of lead screw 1 without substantial deformation of carrier member 5. Depending upon the material, carrying member 5 may comprise a tube or a solid shaft. Suitable materials include ferrous, nonferrous or composite materials. The material may be metallic or nonmetallic. Certain relatively incompressible polymeric material and even wood may be suitable in particular applications. Examples of suitable material include: soft steel (tubing or solid shafts), aluminum, nylon, wood, chromalloy (steel-aluminum alloy), graphite, Kevlar®, Lexan® and powdered metallurgical materials. A preferred material for carrying member 5 is anodized aluminum.

The diameter of carping member 5 is determined by the axial length of travel required of lead screw 1. The longer the length of travel, the larger the diameter of carrier member 5 required to prevent screw whip.

One or more seating grooves 15 are cut into the surface of carrying member 15 to create a helical seating means for helical guide means 10. Seating groove 15 of carrying member 5 can be formed in a material such as anodized aluminum using a lathe. In the lathe process, the outer diameter of cylindrical carrying member 5 is preferably first lathed to ensure it is substantially true. Helical seating groove 15 is then simply lathed therein.

Helical seating groove 15 may also be formed with the use of a CNC milling machine with a CNC lathe axis to control shaft rotation. A suitable CNC milling machine is the Digital Tool DR903 CNC milling machine available from Digital Tool, Inc. of Pittsburgh, Pa. This method is preferable to using a lathe because the scraping, cutting action of a conventional lathe deflects the shaft (carrier member 5) and necessitates the use of a follower rest to support the shaft under the force of the cutting tool. The conventional process thus results in a carrier member that runs less true and with more wobble than one produced with a CNC milling machine.

With a high-speed spindle using a milling cutting tool (known as an end mill), the outer surface of carrier member 5 can be machined true without undue shaft deflection. Moreover, helical seating groove 15 can be more accurately referenced to the machined true outer surface than in a conventional lathe process and the "lead accuracy" more precisely maintained.

Seating groove 15 illustrated in FIG. 2 is rounded at the bottom thereof, but seating groove 15 may take other forms such as V-shaped or rectangular. Seating groove 15 prevents axial and radial movement of helical guide means relative to carrying member 5.

Seating groove 15 is formed upon carrying member 5 to have a lead angle $\Theta$ to provide a desired lead, which is the axial distance lead screw 1 will travel in one revolution thereof. Lead angle $\Theta$ is defined as $\tan^{-1}[\text{lead}/(\Pi \cdot \text{diameter})]$. For example, if lead angle $\Theta$ is selected to provide 144 coils in a 12-foot lead screw, the lead will be one inch. In other words, the distance A between the centers of adjacent coils of seating groove 15 will be one inch.

After seating groove 15 is formed in carrying member 5, helical guide means 10 is then disposed in seating groove 15 to form composite lead screw 1. As shown in FIG. 3, helical guide means 10 is formed to have substantially the same lead as seating groove 15. Preferably, helical guide means 10 is simply rotated or wound onto carrying member 5 (i.e., into seating groove 15).

To ease the winding of helical guide means 10 onto carrier member 5, helical guide means 10 may be formed slightly wider than helical seating groove 15. If helical seating groove 15 is formed wider than helical guide means 10, it is preferable to use an attachment means to ensure that helical guide means 10 does not move within helical seating groove 15. An example of a suitable attachment means is way grout available from Thomson Industries. Preferably, an arched or rounded helical seating groove is used in this case. To ensure that helical guide means 10 is centered in helical seating means 15, the ends of helical guide means 10 may be twisted in opposite directions around the diameter of carrying member 5 to ensure that helical guide means 10 is "pressed" into the bottom of helical seating groove 15.

Alternatively, a helical seating groove 15 can be formed to have a width equal to or slightly less than that of helical guide means 10. Preferably a rectangular or square helical seating groove is used in the case where helical seating groove 15 is narrower than helical guide means 10. Upon winding helical guide means 10 onto carrier member 5, helical guide means 10 is press fit into helical seating groove 15. This process is illustrated schematically in FIG. 3A. Follower nut 100 itself may be used to press fit helical guide means 10 into helical seating groove 15 as follower nut 100 is wound thereover.

Moreover, helical guide means 10 may be cold formed directly onto carrier member 5 as part of the coil or spring winding process discussed above if a square helical seating groove is used. It is also possible to hot wind, quench and temper helical guide means 10 directly onto carrier member 5 in one continuous operation.

Also illustrated in FIG. 1, at least one follower nut 100 is provided for use in connection with lead screw 1 in a linear drive assembly. Follower nut 100 comprises a housing member 110 which can be fabricated from any ferrous, nonferrous or composite material. A preferred material for housing member 110 is aluminum.

Figure 4:
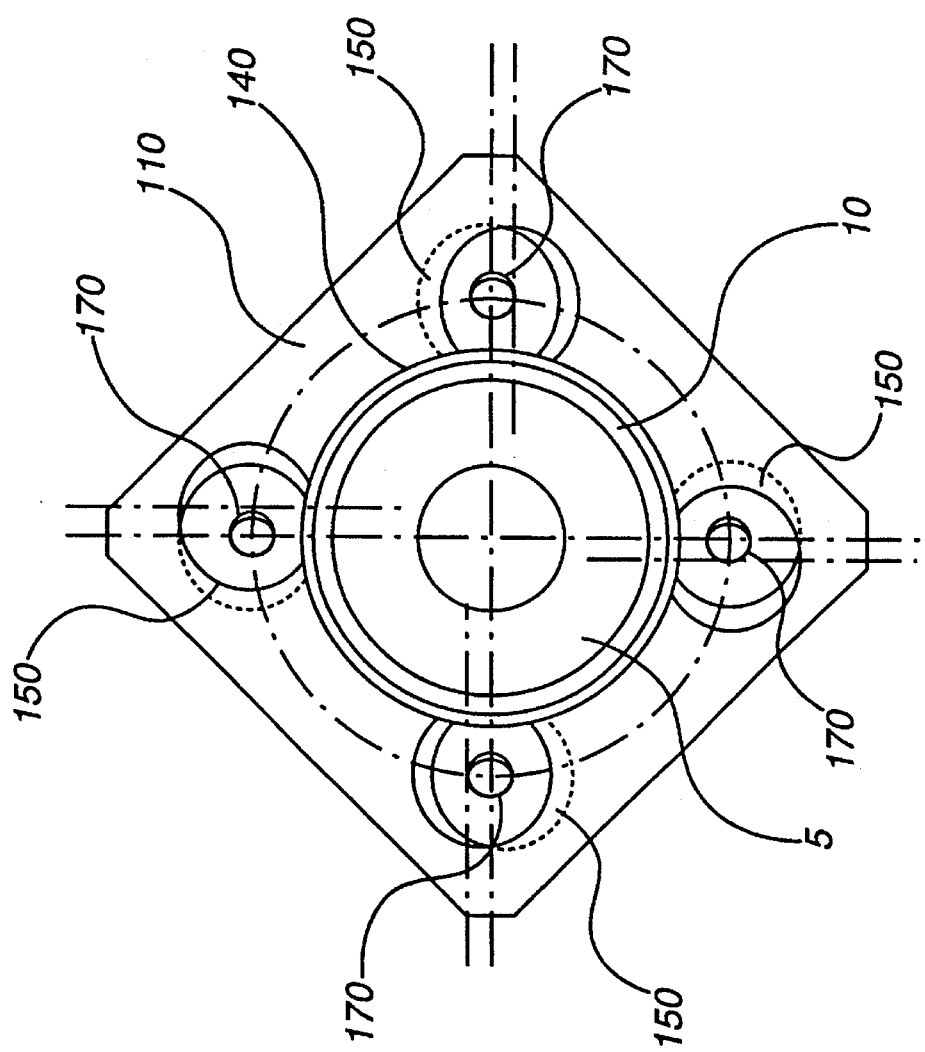
FIG. 4 illustrates a top plan view of a housing member for a follower nut.

For stability, at least three roller bearing means 120 are preferably disposed in a helical, circumferential manner. Use of only two roller bearing means 120 will result in an unstable assembly. Preferably, at least four such roller bearing means 120 are disposed helically about a generally cylindrical bore 140 of housing member 110. In this regard, FIG. 4 illustrates a top plan view of housing member 110 without roller bearing means 120 disposed upon roller bearing seatings 150 thereof, but with lead screw 1 centered in bore 140 thereof.

To counteract torque about the axis of lead screw 1, an independent stabilizing means is preferably used when three or four bearing means 120 are used. An independent stabilizing means is not necessary if at least six roller bearing means 120 (e.g., three roller bearing means 120 on each of two follower nuts 100) are used.

Suitable roller bearing means 120 for use in follower nut 100 are best illustrated in FIG. 1. As shown in FIG. 1, roller bearing means 120 comprise a raceway surface 160 suitable for seating helical guide means 10 when lead screw 1 is threaded through follower nut 100. The shape of raceway surface 160 is determined by the shape of the surface of guide means 10. For example, if a helical guide means having circular cross-sectional shape is used, a rounded raceway surface as shown in FIG. 1 is preferred. If a helical guide means 10 having a V-shaped surface is used, raceway surface 160 is chosen to be V-shaped.

Roller bearing means 120 thus provide a wear or bearing raceway surface 160 for follower nut 100 and provide mechanical efficiency for following nut 100. In conjunction with helical guide means 10, roller bearing means 120 resist axial and radial loads.

Roller bearing means 120 are preferably precision ground from high-quality, hardened steel. Examples of suitable roller bearing means 120 for use in follower nut 100 include the precision ground, double-row angular contact ball bearings (V-shaped) available from Bishop-Wisecarver Corporation and track rollers available from INA and based upon the INA double-row angular contact ball bearing (e.g., INA Track Roller LFR 50/8 KDD).

As best seen in FIG. 1, roller bearing means 120 are also suitably disposed in housing member 110 to threadingly engage helical guide means 10 as lead screw 1 is threaded through bore 140 of follower nut 100. Preferably, roller bearing means 120 are positioned within housing member 110 to have a substantially constant axial distance between the centers of adjacent roller bearing means 120. Preferably, all roller bearing means 120 are located within housing member 110 to engage a single coil of helical guide means 10 and the axial distance between adjacent roller bearing means 120 is approximately equal to lead distance A divided by the number of roller bearing means 120 disposed within housing member 110. For example, if lead distance A is approximately one (1.0) inch and four roller bearing means 120 are disposed within housing member 110, the axial distance between adjacent roller bearing means 120 is preferably approximately 0.25 inch.

Roller bearing means 120 are positioned within housing member 110 upon a helix with the same lead angle as helical guide means 10. As illustrated in FIG. 1, the axial angle of each roller bearing means 120 is preferably determined by rotating the axis by an amount equal to lead angle $\Theta$ while maintaining that axis in a plane parallel to a plane tangent to lead screw 1 at the point of contact of a particular roller bearing means.

Attachment means (not shown) such as bolts are used to attach roller bearing means 120 to roller bearing seatings 150 of housing member 110 via bolt bores 170. Roller bearing seatings 150 are preferably machined to the proper axial angle of a roller bearing means 120 to be seated therein as such axial angle determined in the previous paragraph. For example, concentric and eccentric bolts are available from either Bishop-Wisecarver Corporation or INA (e.g., INA Concentric Bolt LFZ 12/M12 or INA Eccentric Bolt LFE 12-1/M12) for attachment of roller bearing means 120 to housing member 110. Preferably, at least one roller bearing means 120 is attached using an eccentric bolt to enable adjustment/minimization of the radial clearance between the surfaces of helical guide means 10 and roller bearing means 120. More preferably, more than one roller bearing means 120 is attached using an eccentric bolt.

Although, the present invention has been described in detail in connection with the above examples, it is to be understood that such detail is solely for that purpose and that variations can be made by those skilled in the art without departing from the spirit of the invention except as it may be limited by the following claims.

What is claimed is:

1. A follower nut for use in a linear drive assembly in conjunction with a lead screw, the lead screw comprising a helical guide means, the follower nut comprising a housing member, the housing member having a bore axially therethrough, the bore having a diameter slightly greater than the diameter of the lead screw, the follower nut further comprising at least three grooved roller ball bearing means, each of the grooved roller ball bearing means comprising a grooved raceway suitable to seat the helical guide means of the lead screw, the grooved roller ball bearing means disposed around the circumference of the bore upon a helical path having a lead substantially the same as a lead of the helical guide means such that the grooved roller ball bearings means contact the helical guide means and provide a bearing surface therefor when the lead screw is threaded through the bore of the follower nut, an axial angle of each grooved roller ball bearing means being equal to a lead angle of the lead screw, the axis of each grooved roller ball bearing means being maintained in a plane parallel to a plane tangent to the lead screw at a point of contact of the grooved roller ball bearing means.

2. The follower nut of claim 1 wherein the housing member is fabricated from aluminum.

3. The follower nut of claim 1 wherein the raceway of each roller bearing means is fabricated of hardened, ground steel.

4. A linear drive assembly, comprising:
   a. a lead screw, the lead screw comprising:
      i. a generally cylindrical carrier means, the carrier means having disposed therein at least one helical seating groove, the at least one helical seating groove having a lead substantially equivalent to a desired lead of the lead screw; and
      ii. at least one helical guide means, the at least one helical guide means having a lead substantially equivalent to the desired lead of the lead screw and being seated in the at least one helical seating groove; and
   b. at least one follower nut, the at least one follower nut comprising a housing member, the housing member having a bore axially therethrough, the bore having a diameter slightly greater than the diameter of the lead screw, the at least one follower nut further comprising at least three grooved roller ball bearing means, each of the grooved roller ball bearing means comprising a raceway suitable to seat the at least one helical guide means of the lead screw, the grooved roller ball bearing means disposed around the circumference of the bore upon a helical path having a lead substantially the same as the lead of the at least one helical guide means such that the grooved roller ball bearings contact the at least one helical guide means and provide a bearing surface therefor when the lead screw is threaded through the bore of the at least one follower nut, an axial angle of each grooved roller ball bearing means being equal to a lead angle of the lead screw, the axis of each grooved roller ball bearing means being maintained in a plane parallel to a plane tangent to the lead screw at a point of contact of the grooved roller ball bearing means.

5. The linear drive assembly of claim 4 wherein the carrier means is fabricated of anodized aluminum.

6. The linear drive assembly of claim 4 wherein the helical guide means is fabricated of a ground, hardened steel.

7. The linear drive assembly of claim 4 wherein the helical seating groove has a cross-sectional shape selected from the group consisting of a square, a rounded and a V-shaped cross-sectional shape.

8. The linear drive assembly claim 4 wherein the housing member of the follower nut is fabricated from aluminum.

9. The linear drive assembly claim 4 wherein the raceway of each roller bearing means is fabricated of hardened, ground steel.

* * * * *